United States Patent
Bhardwaj

(10) Patent No.: US 9,342,297 B2
(45) Date of Patent: May 17, 2016

(54) SYSTEMS AND METHODS FOR PROVIDING PREDICTIVE QUALITY ANALYSIS

(71) Applicant: Jyoti Bhardwaj, Glen Allen, VA (US)

(72) Inventor: Jyoti Bhardwaj, Glen Allen, VA (US)

(73) Assignee: CAPITAL ONE FINANCIAL CORPORATION, McLean, VA (US)

( * ) Notice: Subject to any disclaimer, the term of this patent is extended or adjusted under 35 U.S.C. 154(b) by 0 days.

(21) Appl. No.: 14/298,675

(22) Filed: Jun. 6, 2014

(65) Prior Publication Data

US 2014/0365991 A1 Dec. 11, 2014

Related U.S. Application Data

(60) Provisional application No. 61/832,363, filed on Jun. 7, 2013.

(51) Int. Cl.
*G06F 9/44* (2006.01)
*G06F 11/36* (2006.01)

(52) U.S. Cl.
CPC .. *G06F 8/70* (2013.01); *G06F 8/71* (2013.01); *G06F 11/36* (2013.01); *G06F 11/362* (2013.01); *G06F 11/366* (2013.01)

(58) Field of Classification Search
None
See application file for complete search history.

(56) References Cited

U.S. PATENT DOCUMENTS

| | | | | |
|---|---|---|---|---|
| 8,997,052 B2* | 3/2015 | Bhagavatula | ....... | G06F 11/3684 717/124 |
| 2005/0216879 A1* | 9/2005 | Ruhe | ...................... | G06Q 10/10 717/101 |
| 2009/0144698 A1* | 6/2009 | Fanning | .................... | G06F 8/75 717/120 |
| 2010/0333069 A1* | 12/2010 | Chandra | ................... | G06F 8/75 717/126 |
| 2011/0067005 A1* | 3/2011 | Bassin | ...................... | G06F 8/10 717/127 |
| 2011/0154293 A1* | 6/2011 | Dharwada | ........... | G06F 11/3692 717/125 |
| 2012/0017280 A1* | 1/2012 | Wiegenstein | ....... | G06F 11/3604 726/25 |
| 2014/0136901 A1* | 5/2014 | Butler | ................. | G06F 11/3051 714/38.1 |

OTHER PUBLICATIONS

Liu, Xiaoqing, et al., "Priority assessment of software process requirements from multiple perspectives", 2006, pp. 1650-1660.*
Zhang, Xuemei, et al., "An Analysis of Factors Affecting Software Reliability", 2000, pp. 43-56.*
Yu, Lian, et al., "Predicting Defect Priority Based on Neural Networks", 2010, pp. 356-367.*

(Continued)

*Primary Examiner* — Thuy Dao
*Assistant Examiner* — Christopher Franco
(74) *Attorney, Agent, or Firm* — Finnegan, Henderson, Farabow, Garrett & Dunner LLP

(57) ABSTRACT

The disclosed embodiments include methods and systems for providing predictive quality analysis. Consistent with disclosed embodiments, a system may receive input data associated with a software program and compare the input data with one or more predetermined analysis parameters. The system may further determine at least one risk rating based on the comparison, wherein each risk rating corresponds to a distinct software category. The system may perform additional operations, including determining at least one adjustment to the software program based on the determined at least one risk rating, and prioritizing the at least one adjustment based on a predetermined adjustment priority standard. Furthermore, the system may provide a report including at least an indication of the at least one prioritized adjustment, a timeline for implementing the at least one prioritized adjustment, and plan implementing the at least one prioritized adjustment.

14 Claims, 9 Drawing Sheets

(56) References Cited

OTHER PUBLICATIONS

D'Ambros, Marco, et al., "An Extensive Comparison of Bug Prediction Approaches", 2010, pp. 31-41.*

Hosseingholizadeh, Ahmad, et al., "A Source-Based Risk Analysis Approach for Software Test Optimization", 2010, pp. V2601-V2604.*

Shihad, Emad, et al., "Pragmatic Prioritization of Software Quality Assurance Efforts", 2011, pp. 1106-1109.*

* cited by examiner

SYSTEMS AND METHODS FOR PROVIDING PREDICTIVE QUALITY ANALYSIS

PRIORITY CLAIM

This application claims priority under 35 U.S.C. §119 to U.S. Provisional Application No. 61/832,363, filed on Jun. 7, 2013, which is expressly incorporated herein by reference in its entirety.

BACKGROUND

Current market demands place a strong emphasis on quality of the product or service being delivered to the customer. This may include not only the grade of the product or service, but whether the product or service was delivered on time and within budget. Often, the quality of the product or service being delivered depends largely on the quality of the underlying process employed to produce the product or service. For instance, the quality of a software output delivered to a customer normally depends on at least the competence or efficiency of the software program and/or hardware systems.

Various organizations utilize an array of quality initiatives to improve quality of process. For instance, in the computer market, an organization may rely on information technology (IT) specialists to diagnosis an inaccurate or inconsistent software or hardware system and provide a remedy. In other instances, the IT specialist may augment a software or hardware system to increase its efficiency for a particular project.

Currently, however, quality analysis is applied on an individual level and not on a broader, global level. For example, individual projects are analyzed for their quality assurance with respect to the individual project. Although this may enhance the current project, it does not take into account the department or organization as whole. This may lead to inconsistent quality measures from one project to the next within the same department or organization. For example a first IT specialist may provide a solution different from a second IT specialist for the same defect in two different projects. In other examples, the first and second projects may require similar quality enhancement measures. A first IT specialist may augment the first project without knowledge that the second project requires similar augmentation. Therefore, a second IT specialist may also be required to familiarize himself with the quality enhancement measures and provide the same augmentation as the first IT specialist. Such inconsistencies and duplication of efforts may result in increased spending, unavailability of optimal resources at the proper time, non-uniform software and hardware systems within the same department or organization, and unawareness by management of all quality enhancement changes.

SUMMARY

Disclosed embodiments include methods and systems configured to, for example, provide consistent and efficient quality enhancement measures for computer systems. The methods and system may analyze software or hardware systems of a particular project, determine if the system requires quality enhancements, and provide adjustment recommendations to enhance the project that are consistent with the organization on a global level. For example, a quality platform system may request data from a software or hardware system and compare this data to various parameters to determine if the software or hardware system lacks one or more features. Therefore, the software or hardware may require one or more adjustments to meet quality assurance levels. The quality platform system may further rank adjustments of various software and/or systems within an organization to determine which adjustments should be implemented first and a timeline completing the adjustments. Additionally, the quality platform system may provide a plan as to how to implement the adjustments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
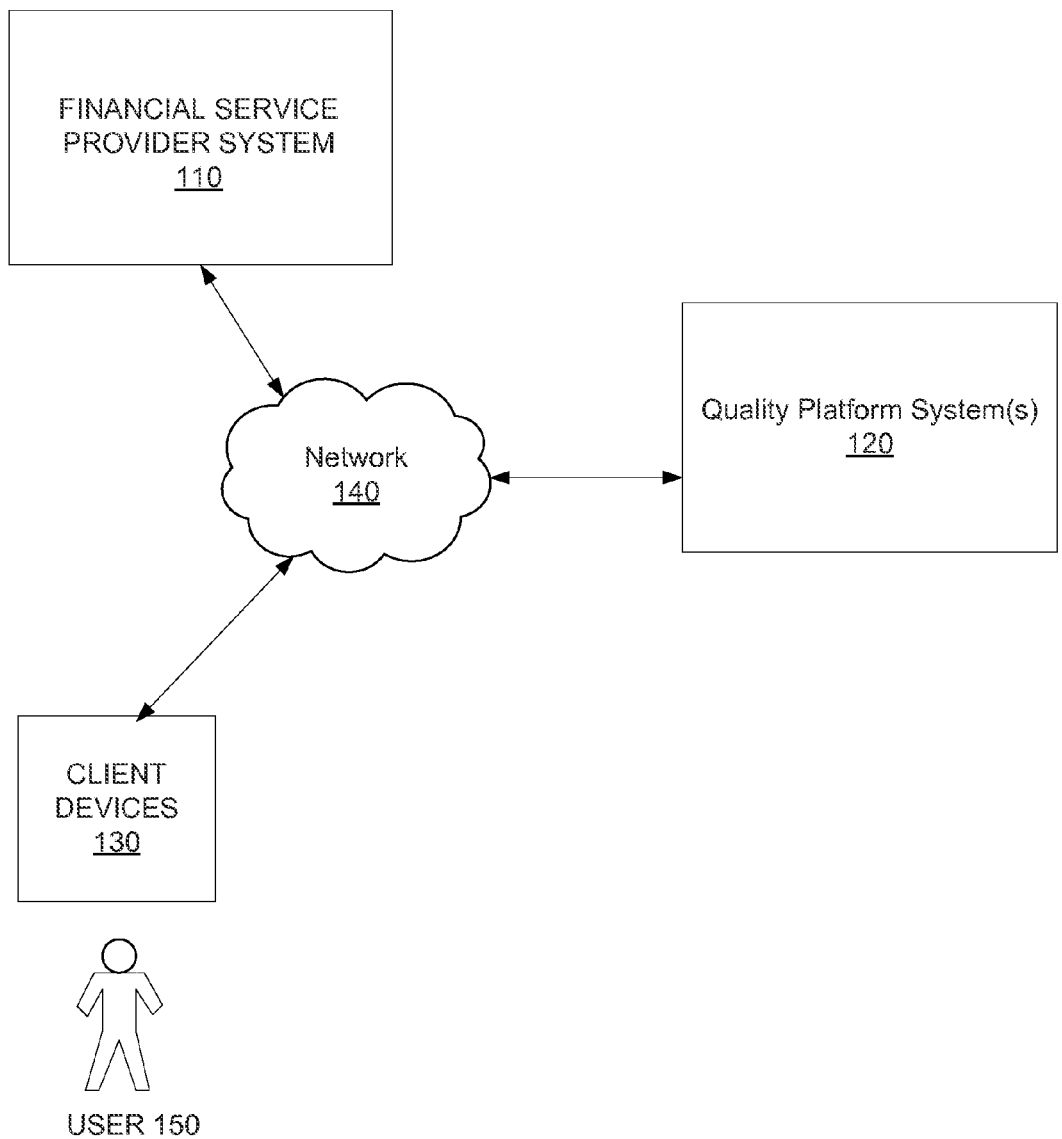
FIG. 1 is a block diagram of an exemplary system, consistent with disclosed embodiments.

FIG. 1 is a block diagram of an exemplary system 100 for performing one or more operations consistent with the disclosed embodiments. In one embodiment, system 100 may include one or more financial service provider systems 110, one or more quality platform systems 120, on or more client devices 130, and network 140. The components and arrangement of the components included in system 100 may vary. Thus, system 100 may include other components that perform or assist in the performance of one or more processes consistent with the disclosed embodiments.

Components of system 100 may be computing systems configured to provide a quality enhancement analysis consistent with disclosed embodiments. As further described herein, components of system 100 may include one or more computing devices (e.g., computer(s), server(s), etc.), memory storing data and/or software instructions (e.g., database(s), memory devices, etc.), and other known computing components. In some embodiments, the one or more computing devices are configured to execute software instructions stored on one or more memory devices to perform one or more operations consistent with the disclosed embodiments. Components of system 100 may be configured to communicate with one or more other components of system 100, including financial service provider system 110, quality platform system 120, and/or client devices 130. In certain aspects, one or more users 150 may operate one or more components of system 100, such as customer devices 130, to initiate one or more operations consistent with the disclosed embodiments. In some aspects, the one or more users 150 may be employees of, or associated with financial service provider system 110 (e.g., someone authorized to use the underlying computing systems or otherwise act on behalf of the entity). In some embodiments, users 150 may include managers or directors of a department within financial service provider system 110. In other aspects, user 150 may not be an employee or otherwise associated with financial service provider system 110. In still other aspects, user 150 may itself be a separate entity associated with financial service provider system 110.

Financial service provider system(s) 110 may be a system associated with an entity providing financial services. For example, financial service provider system 110 may be associated with a bank, credit card issuer, or other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial service provider system 110 may include infrastructure and components that are configured to generate and/or provide financial service accounts such as credit card accounts, checking accounts, debit card accounts, loyalty or reward programs, lines of credit, and the like. For ease of discussion, exemplary embodiments will be discussed through the disclosure in the context of financial service providers. It is to be understood, however, that disclosed embodiments are not limited to use in any particular corporate structure, field of business, or industry.

Figure 2:
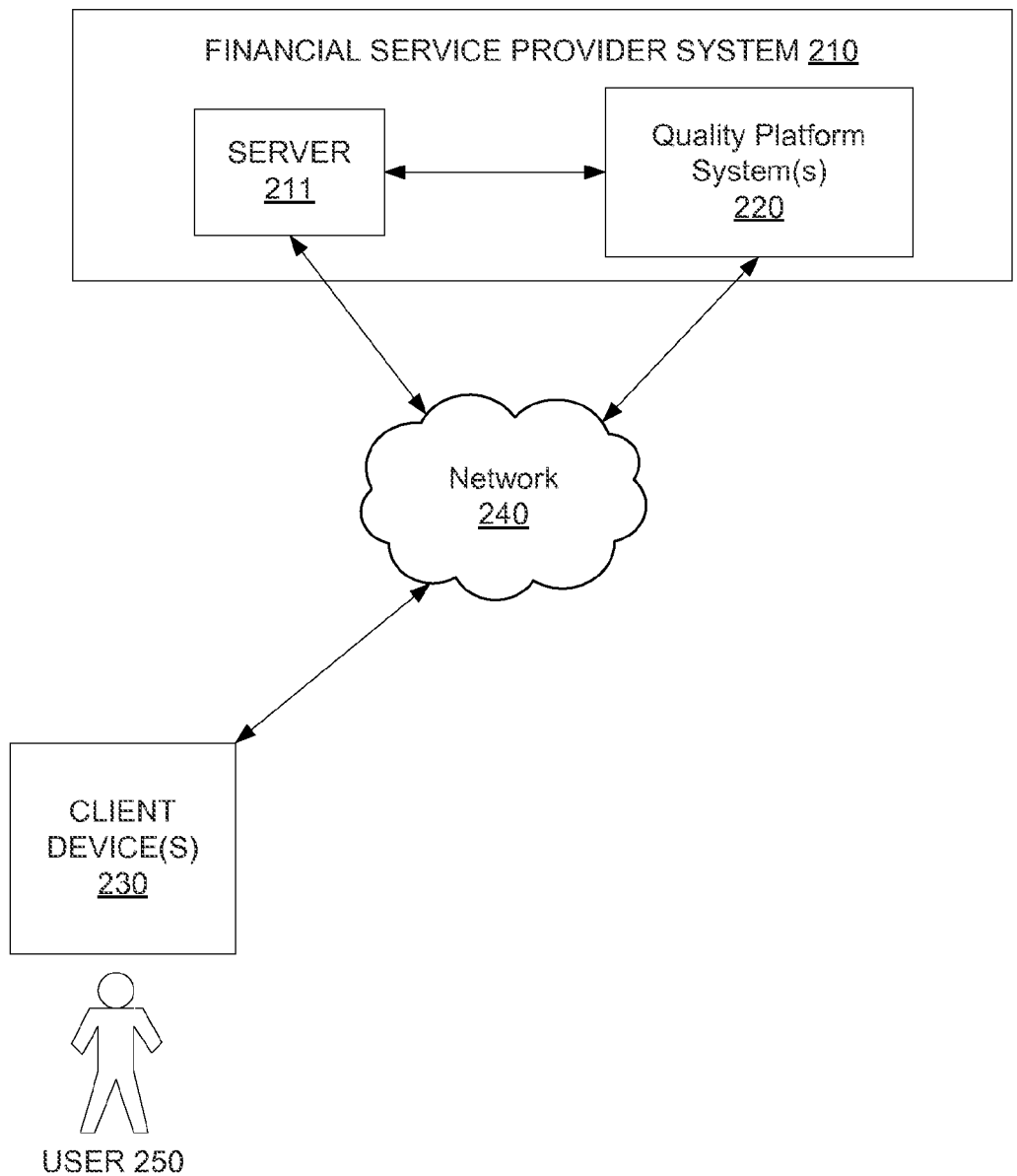
FIG. 2 is a block diagram of another exemplary system, consistent with disclosed embodiments.

Quality platform system(s) 120 may be a system configured to provide quality analysis of a software or hardware system, for example a system associated with financial service provider system 110. In other aspects, the software or hardware system may not be associated with financial service provider system 110, and may be associated with another entity. In some embodiments, as shown in FIG. 1, quality platform system 120 may be a separate entity distinct from financial service provider system 110. In other embodiments, as shown in FIG. 2, quality platform system 120 may be included in financial service provider system 110 and configured to provide services in a manner consistent with that disclosed above in connection with quality platform system 120 shown in FIG. 1. Quality platform system 120 may include one or more computing devices (e.g., server(s)), memory storing data and/or software instructions (e.g., database(s), memory devices, etc.) and other known computing components. Quality platform system 120 may be configured to communicate with one or more components of system 100, such as financial service provider system 110 and/or client devices 130.

Client device(s) 130 may be one or more computing devices configured to perform one or more operations consistent with disclosed embodiments. Client device 130 may be a desktop computer, a laptop, a server, a mobile device (e.g., tablet, smart phone, etc.), or any other type of computing device. Client device(s) 130 may include one or more processors configured to execute software instructions stored in memory, such as memory included in client device 130. Client device 130 may include software that when executed by a processor performs known Internet-related communication and content presentation processes. For instance, client device 130 may execute software that generates and displays interfaces and/or content on client device 130. Client device 130 may be a mobile device that executes mobile device applications and/or mobile device communication software that allows client device 130 to communicate with components over network 140. The disclosed embodiments are not limited to any particular configuration of client device 130.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s), such as links between financial service provider system 110, quality platform system 120, and client devices 130.

FIG. 2 is a block diagram of another exemplary system 200 for performing one or more operations consistent with the disclosed embodiments. In certain embodiments, financial service provider system 210 may be configured to provide a quality analysis consistent with disclosed embodiments. For example, financial service provider system 210 may include a quality platform system 220 that is configured to provide quality enhancement services for software and hardware systems of financial service provider system 110 in a manner consistent with that disclosed above for FIG. 1. Consistent with disclosed embodiments, quality platform system 120 may use or otherwise directly communicate with computing devices of financial service provider system 210 (e.g., server 211). Furthermore, quality platform system 220 may directly access memory devices of financial service provider 210 (not shown) to retrieve, for example, software or hardware data associated with a software or hardware system of financial service provider system 210. Furthermore, financial service provider 210 may otherwise be configured to operate similar to financial service provider system 110 disclosed above in connection with FIG. 1. Similarly, quality platform system 220, client devices 230, and network 240 may also be configured to operate similar to similarly labeled components disclosed above in connection with FIG. 1.

It is to be understood that the configuration and boundaries of the functional building blocks of systems 100 and 200 have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, quality platform system 220 may constitute a part of components of systems 100, 200 other than those specifically described, or may constitute a part of multiple components of system 100 (i.e., a distributed system). Such alternatives fall within the scope and spirit of the disclosed embodiments.

Figure 3:
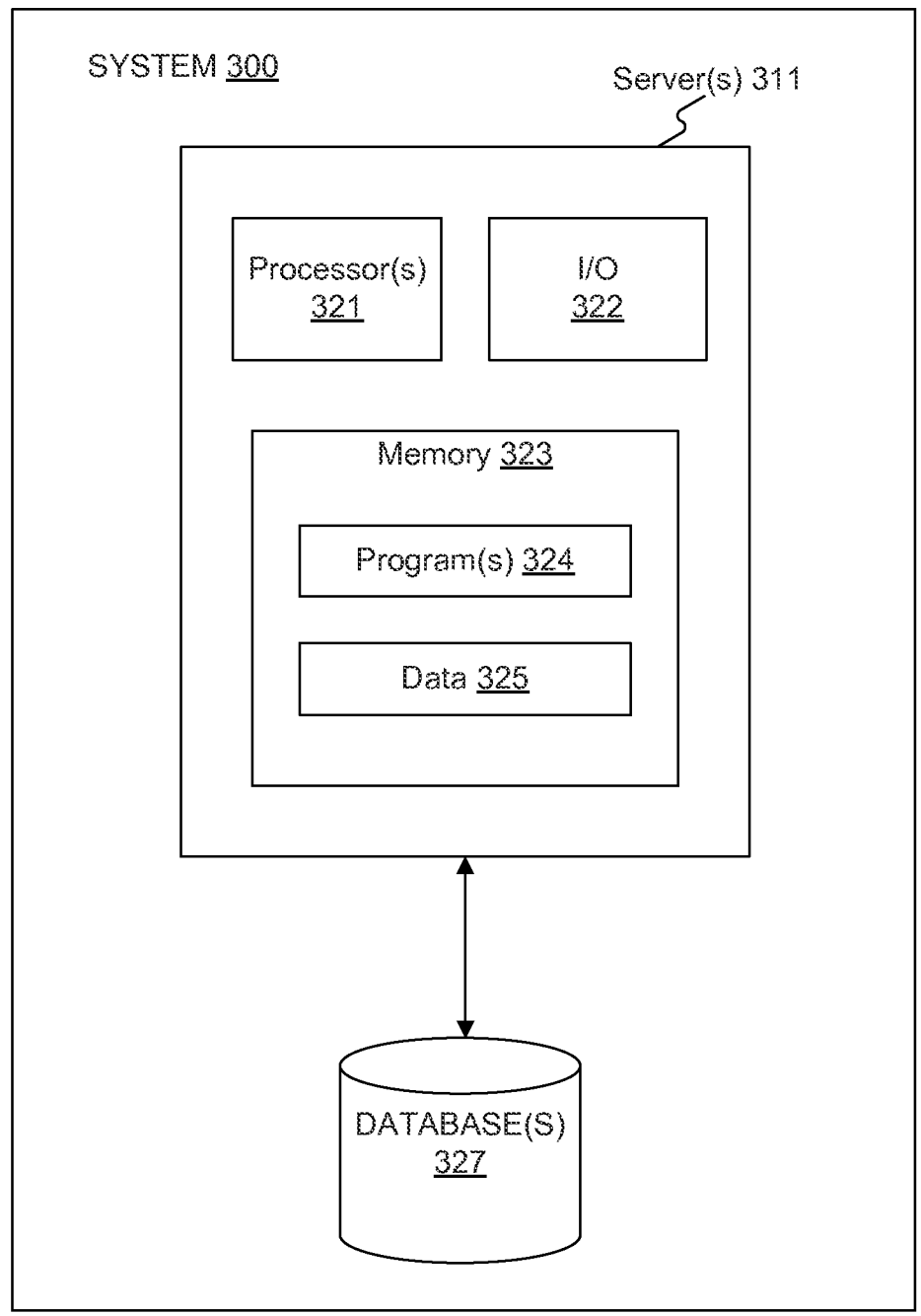
FIG. 3 is a block diagram of another exemplary system, consistent with disclosed embodiments.

FIG. 3 shows an exemplary system 300 for implementing embodiments consistent with the present disclosure. Variations of exemplary system 300 may be used by financial service provider system 110, quality platform system 120, and/or client devices 130. In one embodiment, system 300 may include a server 311 having one or more processors 321, one or more memories 323, and one or more input/output (I/O) devices 322. Alternatively, server 311 may take the form of a mobile computing device, general purpose computer, a mainframe computer, or any combination of these components. According to some embodiments, server 311 may comprise web server(s) or similar computing devices that generate, maintain, and provide web site(s) consistent with disclosed embodiments. Server 311 may be standalone, or it may be part of a subsystem, which may be part of a larger system. For example, server 311 may represent distributed servers that are remotely located and communicate over a network (e.g., network 140) or a dedicated network, such as a LAN. Server 311 may correspond to server 211, or separately to any server or computing device included in financial service provider system 110, quality platform system 120, and/or client devices 130.

Processor 321 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 311.

Memory 323 may include one or more storage devices configured to store instructions used by processor 321 to perform functions related to disclosed embodiments. For example, memory 323 may be configured with one or more software instructions, such as program(s) 324 that may perform one or more operations when executed by processor 321. The instructions stored in memory 323 may define processor 321 to allow the system 300 to implement operations consistent with the present disclosure. The disclosed embodiments are not limited to separate programs or computers configured to perform dedicated tasks. For example, memory 323 may include a single program 324 that performs the functions of the server 311, or program 324 could comprise multiple programs. Additionally, processor 321 may execute one or more programs located remotely from server 311. For example, financial service provider system 110, content provider system 120, advertising system 130, client devices 150, and/or merchant systems 160, may, via server 311, access one or more remote programs that, when executed, perform functions related to certain disclosed embodiments. Memory 323 may also store data 325 that may reflect any type of information in any format that the system may use to perform operations consistent with the disclosed embodiments.

Although system 300 may be implemented as computer processing instructions, all or a portion of the functionality of system 300 may be implemented instead in electronics hardware.

I/O devices 322 may be one or more devices configured to allow data to be received and/or transmitted by server 311. I/O devices 322 may include one or more digital and/or analog communication devices that allow server 311 to communicate with other machines and devices, such as other components of systems 100 and 200.

Server 311 may also be communicatively connected to one or more database(s) 327. Server 311 may be communicatively connected to database(s) 327 through network 140/240. Database 327 may include one or more memory devices that store information and are accessed and/or managed through server 311. By way of example, database(s) 327 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 300 may include database 327. Alternatively, database 327 may be located remotely from the system 300. Database 327 may include computing components (e.g., database management system, database server, etc.) configured to receive and process requests for data stored in memory devices of database(s) 327 and to provide data from database 327.

Figure 4:
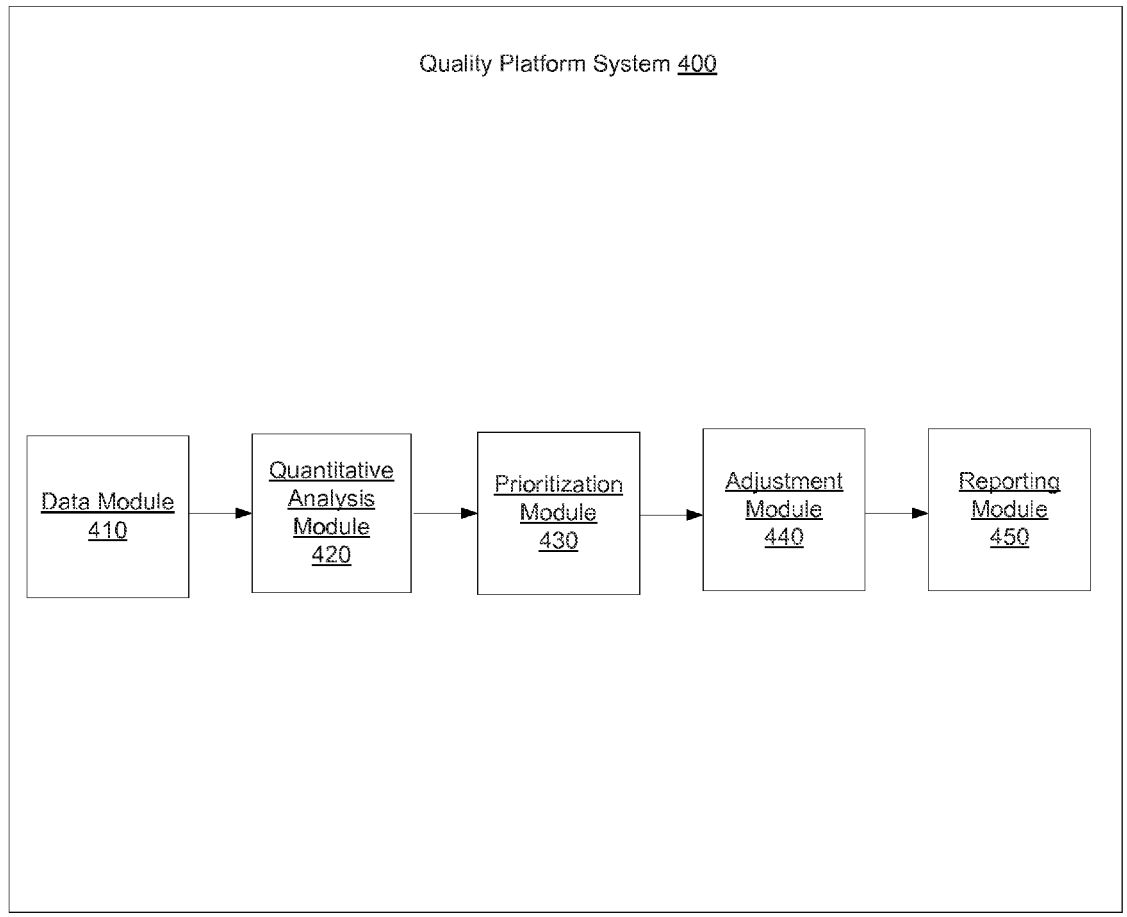
FIG. 4 is an exemplary module structure associated with an exemplary quality platform system, consistent with disclosed embodiments.

FIG. 4 shows a module structure associated with an exemplary quality analysis system, consistent with disclosed embodiments. The described modules may be implemented in software and/or hardware as one or more components of systems 100, 200 or subcomponents of systems 100, 200 to perform one or more aspects of the disclosed embodiments. In one aspect, quality platform system 120, 220 may request and receive data via a data module 410. Data module 410 may receive the data from one or more software or hardware systems, for example software and hardware systems of financial service provider 110, 210, and may include various forms of data, including text files, source code, output of software or hardware system, etc. The input data may relate to aspects of the software or hardware system to be analyzed by quality platform system 120, 220. For example, the input data may include data relating to process development, testing, output of system, and various predefined parameters including release timelines, team size, test coverage percentage, regression automation percentage, test results, the percentage of negative testing (e.g., testing with unexpected input) to positive testing (e.g., testing with expected input), etc.

In certain embodiments, the data module may determine the type of software and/or hardware system to be assessed and request specific data based on the determined software/hardware system. For example, the data module may determine that the system to be assessed is a financial fraud detector program and request data relating to the quality of fraud detection software (e.g. source code for correlation analysis, output of test cases, etc.). In other examples, the data module may determine that the system to be assessed is a printer and request data relating to printer hardware specifications (e.g. time delay in printing, level of detail, etc.). The data module may further store such data in local or outside memory stores.

In one aspect, a quantitative analysis module 420 may compare the data with one or more predefined parameters. The quantitative analysis module 420 may determine that the software or hardware system is not operating at a level of sufficient quality based at least on a determination that the system being analyzed lacks one or more quality control measures, operates at a level that falls below a threshold, or otherwise does not meet one or more of the predefined parameters. For instance, the quantitative analysis module 420 may determine that a financial fraud detector program should have 100 predefined parameters in order to be deemed as meeting sufficient quality measures. In this example, the quantitative analysis module 420 may compare these 100 predefined parameters with the parameters of the selected financial fraud detector program of financial service provider system 110, 210 and determine that the program lacks three parameters. The quantitative analysis module 420 may further determine a risk rating for the software or hardware system, where the risk rating is indicative of the level of quality of the system. For example, a financial fraud detector program that lacks three parameters may be ranked an "8" or a "high risk system". On the other hand, a market analysis program that lacks three parameters may be only be ranked a "2" or a "low risk system".

In one aspect, a prioritization module 430 may prioritize the software and/or hardware systems within a department or organization. In doing so, prioritization module 430 may determine which systems within a department or organization are the most defective/lacking and should be augmented first. Continuing the earlier example, the financial fraud detector program may be given a higher priority than the market analysis program due to its higher risk rating. Additionally, the prioritization module 430 may provide user 150 sufficient access to quality platform system 120, 220 to override or otherwise change the priority levels assigned to various systems being analyzed.

In addition, adjustment module 440 may determine what adjustments are needed for one or more analyzed software and/or hardware systems. Adjustments may include, for example, required and/or suggested changes at the process and/or technology level in order to comply with predefined quality measures. For example, the adjustment module 440 may determine that the exemplary financial detector program requires more test cases or the introduction of a review process at each stage of development to comply with predefined quality measures, but may also suggest a refinement of an automated regression analysis to include an increased regression test cope, test driven development, testing by simulation, parallel test automation and development, etc. The adjustment module 440 process may further determine and generate a timeline to implement the changes and a plan for implementing. The timeline and plan for implementing may be based on the priority and complexity of the changes. In some embodiments, the timeline will be short term (to be implemented in 1-2 months), medium term (3-6 months), or long term (6-12 months). In some embodiments, if the adjustments are determined to be high priority (i.e, the adjustment is required immediately and/or has low or medium complexity), then the adjustment would fall into the short term timeline. Furthermore, a reporting module 450 may provide a quality report to, for example, client device 130 indicating the results of the analysis. According to some embodiments, the report may be tailored for a specific user 150 based on a request received via client device(s) 130. In other embodiments, specialized reports may be provided to user 150 based on preferences indicated in, for example, a user profile associated with user 150 and quality platform system(s) 120, 220. In some embodiments, the specialized report may include the priority levels, required and suggested changes, timeline to implement changes, plan to implement changes, and the like determined for an analyzed system.

Figure 5:
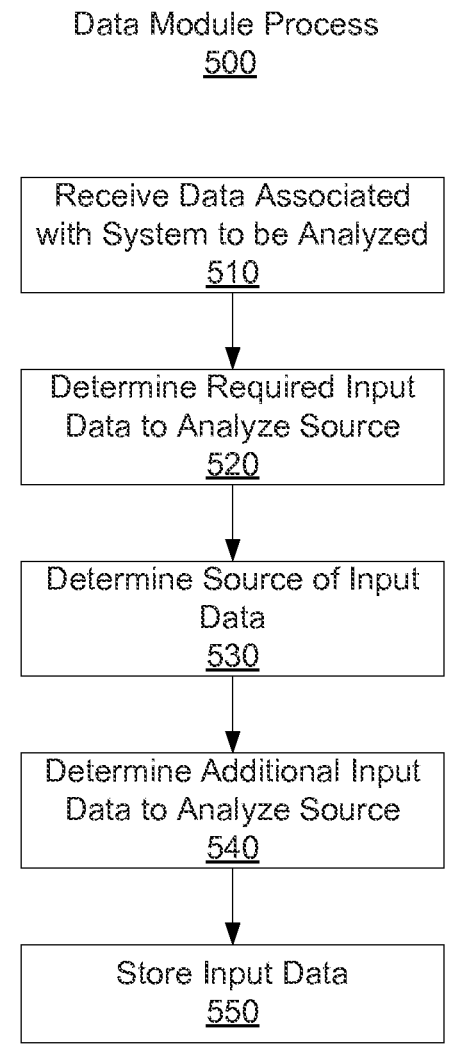
FIG. 5 is a flowchart of an exemplary data module process, consistent with disclosed embodiments.

FIG. 5 shows a flowchart of an exemplary data module process 500, consistent with disclosed embodiments. At step 510, quality platform system 120, 220 may request or otherwise receive data associated with a program/component to be analyzed for quality assurance. The received data may include testing data, analysis reports, system output, source code, or any other type of data associated with parameters of quality assurance. In some embodiments, quality platform system 120, 220 may identify a particular program/component to be analyzed and request the data from the program/component. For example, quality platform system 120, 220 may identify a particular program as a financial fraud detector software system or a printer hardware system based on the product development framework of the software system or a printer hardware system (e.g., agile, waterfall, iterative, ad hoc) or the tools used for product development methodology for the software system or a printer hardware system (e.g., test management, agile tools, version control, requirement management, etc.). In other embodiments, financial service provider system 110, 210, or another entity, may designate the program/component to be analyzed. At step 520, quality platform system 120, 220 may determine the input data required to analyze the program for quality assurance. The input data may include all the data received from the particular program/component to be analyzed or only a select amount of the data.

At step 530, quality platform system 120, 220 may determine a genre associated with the input data source. For example, the source genre may include the type of software program (e.g. fraud, marketing, administrative, docketing, records, human resources, employee benefit program, credit card account system, etc.) or the type of hardware component (e.g. processor, printer, monitor, keyboard, credit/debit card reader, digital notebook, etc.). Based at least on the determination, system 110, 120 may determine the system to be analyzed includes, for example, an administrative software program that tracks vacation and sick leave for each employee of financial service provider system 110, 120 based on recognized protocols in the received data associated with such software, terminology used within the received data, etc. Similarly, system 110, 120 may determine the system to be analyzed includes a network controller hardware component based on standardized network protocols indicated in the received data, machine code identifying the hardware, etc. Based on the determined genre, quality platform system 120, 220 may determine the value of received input data in view of the genre's quality control requirements and/or request and receive specific additional input data. For example, quality platform system 120, 220 may request certain data from the software program designed to track employee leave that is different from the data requested from the network controller hardware component.

Data module process 500 may further include determining additional input data needed to analyze the selected software program or hardware component (step 540). Quality platform system 120, 220 may receive data associated with the system to be analyzed, and further determine that additional input data is required to analyze the system for quality assurance. Quality platform system 120, 220 may determine that such data is critical to properly analyze the system. In some embodiments, the additional input data may be dependent upon the determined source of the received data. For example, quality platform system 120, 220 may determine that input data relating to the number of vacation and sick days and/or how that data is calculated is required to fully analyze the exemplary administrative program that tracks vacation and sick leave. On the other hand, quality platform system 120, 220 may require different additional input data is required to analyze a financial fraud detector program, such as data associated with the program's criteria for determining financial fraud. Quality platform system 120, 220 may request such additional data if it has not received this data from the selected software program or hardware component. In some embodiments, quality platform system 120, 220 may not analyze the program for quality assurance until it has received this additional data. For example, in some embodiments, quality platform system 120 may have some minimum requirements for the initial data input based on the genre of the application and require additional information before proceeding with the analysis.

It is contemplated that quality platform system 120, 220 may not receive all the input data requested from a source lacking in quality. For example, quality platform system 120, 220 may not receive test case input data from a source lacking in test cases. Quality platform system 120, 220 may request input data relating to various aspects of the source, including process development, testing, output of source, and various predefined parameters comprising release timelines, team size, test coverage percentage, regression automation percentage, test results, etc. The input data may include text files, source code, and/or direct feed from the source. Various formats of the input data include, for example, Unicode, GIF, TIT, PNG, PDF, PostScript, JPEG, WAV, csv files, xml files, etc.

Quality platform system 120, 220 may further store the received input data (step 550), which may include the data received at step 510 and the additional data received at step 540. Therefore, quality platform system 120, 220 may filter out the data determined in step 510, which may be already stored, from the additional data received. The input data may be stored in local memory, in one or more databases 327, or in a separate database associated with quality platform system 120, 220.

Figure 6:
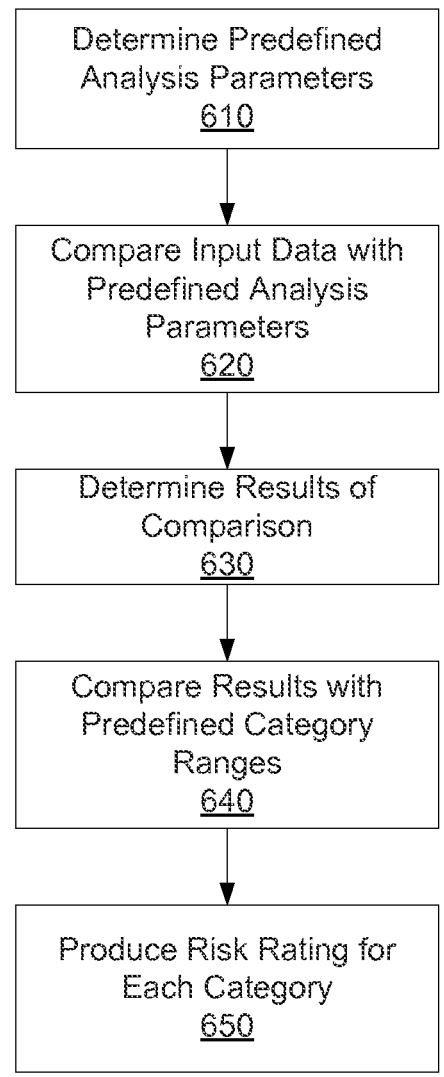
FIG. 6 is a flowchart of an exemplary quantitative analysis module process, consistent with disclosed embodiments.

FIG. 6 shows a flowchart of an exemplary quantitative analysis module process, consistent with disclosed embodiments. In accordance with some embodiments, quality platform system 120, 220 may determine one or more predetermined analysis parameters based at least on the determined source of the input data provided at 530 (step 610). In some embodiments, user 150 may provide one or more analysis parameters via a user interface provided by one or more components of system 100, 200. The analysis parameters may be specific to the source of the data, generally directed to the type of system being analyzed, or generic to all types of systems. Continuing the earlier example, the analysis parameters for an administrative software program tracking vacation and sick leave for employees may include such parameters as, (i) does the program record the number of vacation days for each employee, (ii) does the program record the number of sick days for each employee, (iii) are these values updated on a daily basis, (iv) are the employees notified if they reach a maximum limit, (v) are the number of sick and vacation days held constant at this upper limit. Other parameters for various software programs may include, for example, (i) are regression scenarios in place, (ii) is there automated regression, (iv) are test cases created, (v) are the test cases mapped to all requirements, (vi) what is the quality of the test cases, (vii) are all detailed steps covered in the test cases or only high level testing, (viii) is there a version control mechanism, (ix) is there a root cause analysis process, (x) are test cases reviewed by a business department, (xi) if a vendor is involved is the vendor process tool aligned, (xii) what is the defect density, (xiii) what is the team skill set mapping, (xiv) what is the defect escape rate to production, (xv) what is the defect contamination rate, (xvi) is there a vacation tracker, (xvii) what is the return on investment, (xviii) is there sufficient staffing, (xix) what is the cost, etc.

Quality platform system 120, 220 may compare the predetermined analysis parameters with the input data (step 620) and determine the results of this comparison (step 630). For example, quality platform system 120, 220 may compare the predefined analysis with the input data and determine that one or more parameters do not correspond with the input data properly. For example, for the example administrative program tracking vacation and sick leave for employees, quality platform system 120, 220 may determine that the input data from the administrative program does not include data associated with a parameter requiring daily updates to the number of sick and vacation days. Therefore, quality platform system 120, 220 may determine that the program is not making daily updates to that data (because the data is not present) and, therefore, the parameter is not met by the input data. Based on this comparison, quality platform system 120, 220 may determine that the administrative program does not update the number of sick and vacation days on a daily basis. In another embodiment, quality platform system 120, 220 may determine that the source (i.e., software program or hardware component) does conduct automated regression testing based on the input data and therefore meets a predetermined parameter for that program/type of program. In other embodiments, quality platform system 120, 220 may determine that more than one parameter is not met based on the input data for a particular source. For example, quality platform system 120, 220 may determine that a particular software program is missing five out of twenty parameters.

As shown in step 640, quality platform system 120, 220 may compare the results of step 630 with a predefined category range that indicates an acceptable range of missing parameters for a given program/type of program or component analyzed. The predefined category range may correspond to a distinct software category, hardware category, etc. For example, a fraud software program may have a lower acceptable predefined category range than a marketing or administrative software program. In one example, quality platform system 120, 220 may determine that a predefined category range for fraud software is "2", while a predefined category range for marketing software is "10". Quality platform system 120, 220 may also produce a risk rating for each source based on the results of step 640 (step 650). Continuing the earlier example, if quality platform system 120, 220 determines that a fraud software program and a marketing software program are both missing three parameters from their input data, quality platform system 120, 220 may designate the fraud software as a "high risk rating" (because three missing parameters is above the acceptable category range for fraud software of zero to two) and designate the marketing software as a "low risk rating" (because three missing parameters is well below the acceptable category range for marketing software of zero to ten).

Alternatively or additionally, the risk rating may be based on which parameters are missing from the input data. For example, quality platform system 120, 220 may designate certain parameters as "critical" and others as "trivial." A source may only be given a high risk rating if more than a predefined number of "critical" parameters are missing from its input data. For example, the fraud software program example with three missing parameters may be designated a "low risk rating" if all three parameters are deemed "trivial" parameters. In contrast, quality platform system 120, 220 may designate the fraud software program with three missing "critical" parameters as a high risk rating if the predefined category range for fraud software is two "critical" parameters. In other embodiments, the risk rating may be based, at least in part, on the analysis by quality platform system 120, 220. For example, a source with one or more missing parameters may be designated a high risk rating if quality platform system 120, 220 only performed on a high level review on the source. But a second source, with the same number of missing parameters, may be designated a low risk rating if quality platform system performed a detailed review on the second source.

The risk rating may comprise various formats, including numbers, letters, colors, words, phrases, or a combination thereof. For example, the risk rating may be a number ranging from "1" to "10", where "10" is a relatively high risk and 1 is a relatively low risk. In other embodiments, a high risk rating may be designated with a red color, a medium risk rating with an orange color, and a low risk rating with a green color. In other embodiments, a high risk rating may be associated with the phrase "warning, this program is at high risk for quality assurance," and a low risk rating may be associated with the phrase "this program complies with quality assurance."

Figure 7:
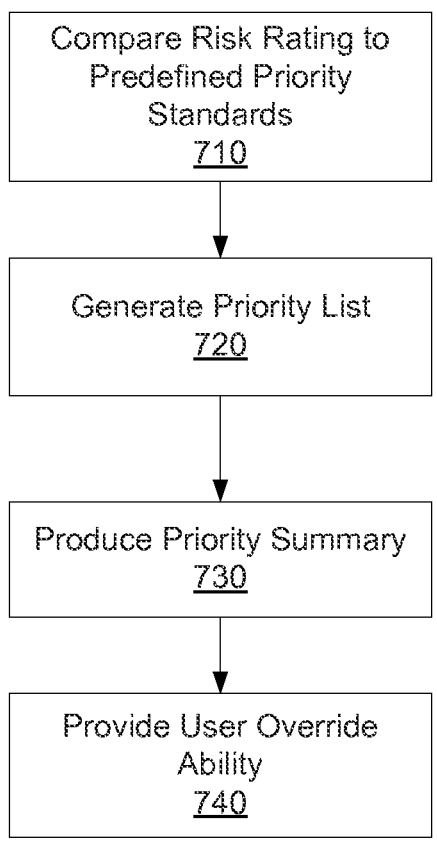
FIG. 7 is a flowchart of an exemplary prioritization module process, consistent with disclosed embodiments.

FIG. 7 shows a flowchart of an exemplary prioritization module process 700, consistent with disclosed embodiments. Quality platform system 120, 220 may compare the risk ratings of a plurality of quality assessments associated with systems within a department or organization (step 710). In some embodiments, quality platform system 120, 220 may prioritize the compared risk ratings based on one or more predetermined adjustment priority standards and generate a priority list based on the results of the comparison (step 720). In some embodiments, the prioritization results may be provided to user 150 via, for example, client device 130 or an interface of quality platform system 120.

In one embodiment, quality platform system 120, 220 may compare the risk ratings of multiple programs and/or components with the priority standards. For example, quality platform system 120, 220 may consider all the software programs and/or components utilized by a particular department, such as a fraud department or a marketing department. In other examples, quality platform system 120, 220 may consider all systems utilized by the entire financial service provider system 110, 210. In yet another example, quality platform system 120, 220 may only consider all the systems utilized by one user 150.

In some embodiments, the risk rating for each system discussed above (e.g., all programs/components utilized by a particular department, by a specific user, etc.) may be prioritized based on the one or more distinct and predetermined adjustment priority standards. Each priority standard may be specific for a particular department, section, or portion of financial service provider system 110, 210. For example, the marketing department may be assigned a first priority standard, the fraud department a second priority standard, etc. Each predefined priority standard may be representative of current industry standards, user ability to augment the source, cost of augmenting, etc. Therefore, a higher priority standard may require changes sooner, be easier to fix, cheaper to fix, etc. as determined by financial service provider system 110, 210. In one example, quality platform system 120, 220 may assign the marketing department a priority standard of "5" and the fraud department a priority standard of "6" based on the determinations of financial service providers system 110, 210.

According to some embodiments, quality platform system 120, 220 may consider the risk rating for each system in view of its associated priority level. Therefore, continuing the earlier example, a risk rating of a marketing software program may be analyzed with respect to the marketing department priority standard of "5," and a risk rating of a fraud software program may be analyzed with respect to the fraud department priority standard of "6." Based on the analysis, quality platform system 120, 220, may prioritize the order in which the analyzed systems should be augmented. Therefore, if the marketing software program has a risk rating of "3" and the fraud software program has a risk rating of "5," quality platform system 120, 220 may determine that the changes to the fraud software program are given a higher priority rate than changes to the marketing analysis program.

In other embodiments, quality platform system 120, 220 may provide prioritization results at an individual adjustment level for each assessed system. For example, quality platform system 120, 220 may prioritize a first and second adjustment to the fraud software program higher than an adjustment to the marketing software program, but prioritize a third adjustment to the fraud software program below the adjustment to the marketing software program. Such priority levels may be based on the current focus of the business/organization and/or the impact of the adjustment. For example, if standardizing the tools/frameworks leveraged for product development are a higher priority than insourcing/outsourcing optimization, tools standardization would be given higher priority than sourcing/outsourcing optimization. Additionally or alternatively, quality platform system 120, 220 may determine the priority based on the impact of the parameter on the system quality. For example, poor code quality would severely impact the analyzed system as compared to a schedule slippage and therefore code quality will be given more weightage than schedule planning.

In still further embodiments, quality platform system 120, 220 may compare the results of step 630, e.g. the number of parameters missing from the received input data, rather than the risk rating, with the predefined priority standards to determine the priority results. For example, priority may be given to programs missing larger number of quality assurance parameters. It is further contemplated that quality platform system 120, 222 may use various means and systems to determine the priority of the adjustments to one or more sources.

As shown in step 730, quality platform system 120, 220 may produce a priority summary to user 150 via, for example, client device 130 and/or an interface of quality platform system 120, 220. The priority summary may include a listing of all adjustments from each assessed system, as well as the priority of each individual adjustment and/or system adjustment. Priorities ranked higher on the priority summary may be more urgent, easier to fix, cheaper to fix, etc. Quality platform system 120, 220 may provide the priority summary to user 150 through client device 130 and/or an interface of quality platform system 120, 220.

Quality platform system 120 may further provide a user 150 (via, e.g., client device 130 and/or an interface of quality platform system 120, 220) override ability (step 740) such that user 150 may change the priority assigned to individual adjustments of an assessed system or system augmentations as a whole. Therefore, user 150 may alter (via, e.g., client device 150 and/or an interface of quality platform system 120, 220) the priority levels of one or more assessed systems or one or more individual adjustments for any of the assessed systems. The user override changes may be reflected in the priority summary. In some embodiments, an updated priority summary may be generated based on received user overrides.

Figure 8:
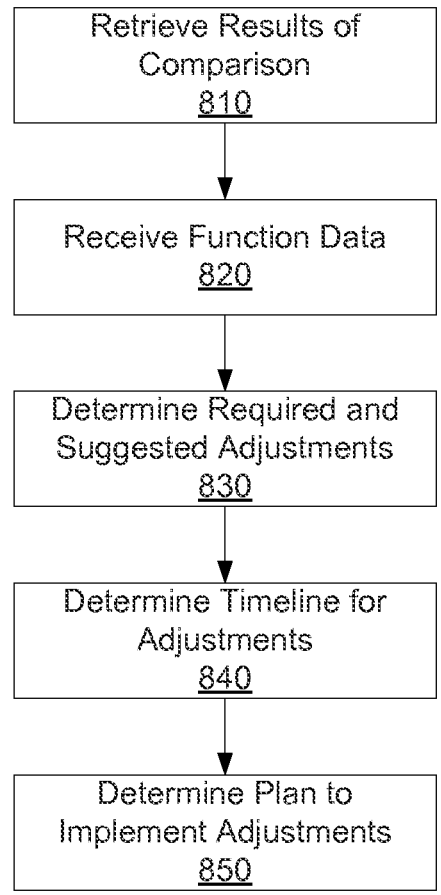
FIG. 8 is a flowchart of an exemplary adjustment module process, consistent with disclosed embodiments.

FIG. 8 shows a flowchart of an exemplary adjustment module process 800, consistent with disclosed embodiments. At step 810, quality platform system 120, 220 may retrieve stored results of the comparison of the input data with the predefined analysis parameters from step 630. Quality platform system 120, 220 may additionally receive function data from financial service provider system 110, 210 that indicates what may have an impact on the time and ability to make the changes to the source (step 820). For example, the function data may include weather conditions, cost of supplies, cost of labor, availability of labor, etc.

As shown in step 830, quality platform system 120, 220 may determine specific adjustments to the assessed system (i.e. software or hardware component) so that that the assessed system maintains a sufficient level of quality. For example, quality platform system 120, 220 may determine various changes to the source code, one or more algorithms, identify the need for solution accelerators including but not limited to product management tools/framework, knowledge management framework enhancement, process standardization, optimization team sizing, etc. This determination may be based on at least one of: the comparison of the input data with the predefined analysis parameters (see step 630) and the function data (step 820). For example, consistent with some embodiments, quality platform system 120, 220 may determine that adjustments to the source should not be implemented due to the high cost of labor, minimal return on investment, low business priority, low organization focus, plans to outsource, low impact on quality improvement, etc.

Quality platform system 120, 220 may further determine which adjustments are required and which are only suggested. For example, quality platform system 120, 220 may determine that a first adjustment is urgent and necessary to maintain a sufficient quality level, and therefore is required. A second adjustment, however, may provide the assessed system with only an enhancement not significantly affecting the quality level of the assessed system, and therefore only suggest the adjustment.

Additionally, quality platform system 120, 220 may determine a timeline for implementing the adjustments (step 840) and a plan for implementing the adjustments (step 850). In some embodiments, the plan and timeline may be designated as short term (to be implemented in 1-2 months), medium term (to be implemented in 3-6 months), or long term (to be implemented in more than 6 months). The timeline and plan may be based, at least in part, on the function data and the priority of the adjustment. For example, quality platform system 120, 220 may determine that including missing test case source code from an assessed system should take one week to remedy with the current labor force and other projects. Additionally, quality platform system 120, 220 may determine that the missing test cases are critical to the organization and therefore should be implemented in the short term. The timeline may display the time frame when the adjustments should be completed, including all the relevant stages for implementing the change. Additionally, the timeline may be updated based on the progress of the changes. The plan to implement may include various systems and methods that may be used to perform the adjustment. For example, the plan may include adjustments by IT, maintenance workers, and/or a separate entity not associated with financial service provider system 110, 210. The plan may be based on protocol developed by industry standards or by financial service provider system 110, 210. The timeline and plan to implement may be provided to user 150 through, for example, client device 130.

Figure 9:
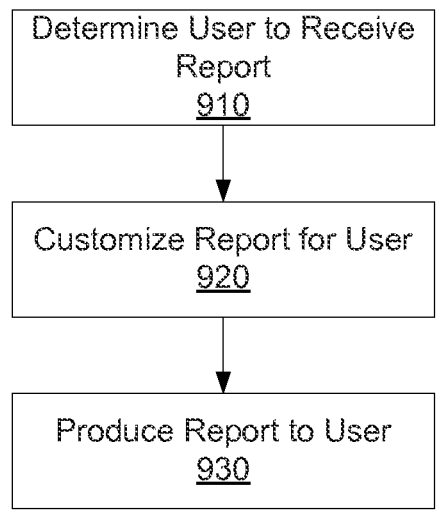
FIG. 9 is a flowchart of an exemplary reporting module process, consistent with disclosed embodiments.

FIG. 9 shows a flow chart of an exemplary reporting module process 900, consistent with the disclosed embodiments. At step 910, quality platform system 120, 220 may determine which of a plurality of users 150 is to receive the report. In some embodiments, user 150 may request the report, and quality platform system 120, 220 may send the report to this user. In other embodiments, quality platform system 120, 220 may send the report to all users 150 working on a particular project, within a particular department, having certain titles, etc., regardless of whether they requested the report. Quality platform system 120, 220 may customize the report for the specific user 150 (step 920). For example, if only users in the marketing department are to receive the reports, quality platform system 120, 220 may include only material relevant to the marketing department. For example, quality platform system 120, 220 may report only changes needed to software used by the marketing department. The report may include such information as the priority summary, required and suggested adjustments, timeline for the adjustments, and plan to implement the adjustments, as disclosed above. Quality platform system 120, 220 may also produce the report to client device 130 for display to user 150.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A method for providing consistent quality control for software programs, comprising:
    receiving input data associated with a software program;
    comparing the input data with one or more predetermined analysis parameters;
    determining, by one or more processors, at least one risk rating based on the comparison, wherein each risk rating corresponds to a distinct software category;
    determining, by the one or more processors, at least one process adjustment and at least one technology level adjustment to the software program based on the determined at least one risk rating;
    prioritizing, by the one or more processors, the at least one process adjustment and at least one technology level adjustment based on a predetermined adjustment priority standard;
    providing a user override to change prioritization of the at least one process adjustment or the at least one technology level adjustment to the software program;
    providing a timeline for implementing the at least one prioritized process adjustment and the at least one prioritized technology level adjustment; and
    providing a report including at least an indication of the at least one prioritized level adjustment and the at least one prioritized technology level adjustment.

2. The method of claim 1, wherein the input data received is dependent on the functions of the software program.

3. The method of claim 1, wherein the risk rating corresponds to a determined quality rating of the software program.

4. The method of claim 1, wherein at least one of the at least one process adjustment or the at least one technology level adjustment to the software program includes a required adjustment and a suggested adjustment.

5. The method of claim 1, further including:
    providing a plan for implementing the at least one prioritized process adjustment and the at least one prioritized technology level adjustment.

6. A system for providing consistent quality control for a software program, comprising:
    one or more processors; and
    one or more memory devices storing instructions that, when executed by the one or more processors, performs the operations of:
        receiving input data associated with a software program;
        comparing the input data with one or more predetermined analysis parameters;
        determining at least one risk rating based on the comparison, wherein each risk rating corresponds to a distinct software category;
        determining at least one process adjustment and at least one technology level adjustment to the software program based on the determined at least one risk rating;
        prioritizing the at least one process adjustment and the at least one technology level adjustment based on a predetermined adjustment priority standard;

providing a user override to change prioritization of the at least one process adjustment or the at least one technology level adjustment to the software program;

providing a timeline for implementing the at least one prioritized process adjustment and the at least one prioritized technology level adjustment; and providing a report including at least an indication of the at least one prioritized process adjustment and the at least one prioritized technology level adjustment.

7. The system of claim 6, wherein the input data received is dependent on the functions of the software program.

8. The system of claim 6, wherein the risk rating corresponds to a determined quality rating of the software program.

9. The system of claim 6, wherein at least one of the at least one process adjustment or the at least one technology level adjustment to the software program includes a required adjustment and a suggested adjustment.

10. The system of claim 6, where the one or more memory devices store instructions that, when executed by the one or more processors, performs the operations of:

providing a plan for implementing the at least one prioritized process adjustment and the at least one prioritized technology level adjustment.

11. A non-transitory computer readable medium storing software instructions that, when executed by one or more processors, configure the one or more processors to perform operations comprising:

receiving input data associated with a software program;

comparing the input data with one or more predetermined analysis parameters;

determining at least one risk rating based on the comparison, wherein each risk rating corresponds to a distinct software category;

determining at least one process adjustment and at least one technology level adjustment to the software program based on the determined at least one risk rating;

prioritizing the at least one process adjustment and at least one technology level adjustment based on a predetermined adjustment priority standard;

providing a user override to change prioritization of the at least one process adjustment or the at least one technology level adjustment to the software program;

providing a timeline for implementing the at least one prioritized process adjustment and the at least one prioritized technology level adjustment; and providing a report including at least an indication of the at least one prioritized level adjustment and the at least one prioritized technology level adjustment.

12. The medium of claim 11, wherein the risk rating corresponds to a determined quality rating of the software program.

13. The medium of claim 11, wherein at least one of the at least one process adjustment or the at least one technology level adjustment to the software program includes a required adjustment and a suggested adjustment.

14. The medium of claim 11, wherein the one or more processors are further configured to perform the operations of:

providing a plan for implementing the at least one prioritized process adjustment and the at least one prioritized technology level adjustment.

* * * * *